United States Patent
Urano et al.

(10) Patent No.: US 11,605,306 B2
(45) Date of Patent: Mar. 14, 2023

(54) SYSTEMS AND METHODS FOR DRIVER TRAINING DURING OPERATION OF AUTOMATED VEHICLE SYSTEMS

(71) Applicant: Toyota Research Institute, Inc., Los Altos, CA (US)

(72) Inventors: Hiromitsu Urano, Numazu (JP); Kentaro Ichikawa, Sunto-gun (JP); Junya Ueno, Susono (JP)

(73) Assignee: Toyota Research Institute, Inc., Los Altos, CA (US)

( * ) Notice: Subject to any disclaimer, the term of this patent is extended or adjusted under 35 U.S.C. 154(b) by 364 days.

(21) Appl. No.: 16/916,440

(22) Filed: Jun. 30, 2020

(65) Prior Publication Data

US 2021/0407313 A1    Dec. 30, 2021

(51) Int. Cl.
*G09B 9/042* (2006.01)
*G09B 9/052* (2006.01)
*G09B 19/16* (2006.01)

(52) U.S. Cl.
CPC ............. *G09B 9/042* (2013.01); *G09B 9/052* (2013.01); *G09B 19/167* (2013.01)

(58) Field of Classification Search
CPC ....... G09B 9/042; G09B 9/052; G09B 19/167
USPC .......................................................... 434/66
See application file for complete search history.

(56) References Cited

U.S. PATENT DOCUMENTS

| | | | |
|---|---|---|---|
| 10,169,932 B2 | 1/2019 | Ishikawa et al. | |
| 10,222,228 B1 | 3/2019 | Chan et al. | |
| 10,528,837 B1 | 1/2020 | Krishnan | |
| 10,571,908 B2 | 2/2020 | Joyce et al. | |
| 2009/0038387 A1 | 2/2009 | Endo et al. | |
| 2017/0061826 A1 | 3/2017 | Jain et al. | |
| 2018/0067486 A1 | 3/2018 | Yako et al. | |
| 2019/0300016 A1 | 10/2019 | Matsushita et al. | |
| 2019/0382030 A1 | 12/2019 | Hotson et al. | |
| 2022/0126864 A1* | 4/2022 | Moustafa | B60W 60/001 |

OTHER PUBLICATIONS

Koopman et al., "Safety Argument Considerations for Public Road Testing of Autonomous Vehicles," SAE Int. J. Adv. & Curr. Prac. in Mobility 1(2):512-523, 2019, pp. 1-12, found at: https://doi.org/10.4271/2019-01-0123.
Bolte et al., "Towards Corner Case Detection for Autonomous Driving," pp. 1-9, found at: arXiv:1902.09184v2 [cs.CV]Feb. 26, 2019.

* cited by examiner

*Primary Examiner* — Robert P Bullington
(74) *Attorney, Agent, or Firm* — Christopher G. Darrow; Darrow Mustafa PC

(57) ABSTRACT

System, methods, and other embodiments described herein relate to a training system to train a driver about occurrences of anomalous driving events of automated vehicle systems. In one embodiment, a method includes determining, upon receiving a selection of a vehicle behavior from one or more anomalous driving events and a detected state change signal, whether the vehicle behavior affects one or more entities. The method includes assessing a state of the one or more entities to simulate the vehicle behavior according to a safety standard. The method includes triggering simulation of the vehicle behavior if the state satisfies a threshold. The method includes simulating the vehicle behavior by at least controlling the vehicle to simulate the vehicle behavior during automated driving of the vehicle.

20 Claims, 6 Drawing Sheets

SYSTEMS AND METHODS FOR DRIVER TRAINING DURING OPERATION OF AUTOMATED VEHICLE SYSTEMS

TECHNICAL FIELD

The subject matter described herein relates, in general, to a training system, and, more particularly, to training a driver about anomalous driving events.

BACKGROUND

Vehicles are equipped with autonomous driving modules, as part of an automated driving system (ADS), to facilitate automated driving. A driver may need training to learn the capabilities and limits of an automated driving mode for a particular vehicle. A driver accustomed to level 1 or 2 automated driving may also need the training for higher levels. Also, an experienced driver may need re-training after becoming too comfortable with ADS mode of automated driving. A driver may learn ADS capabilities through a vehicle manual, a driving school, a vehicle tutorial in parked mode, training in a special driving facility, a virtual training system, using special vehicle equipment, an interactive website, or the like. Training through these methods may be time-consuming, inconvenient, or ineffective at comprehensively training a driver of various experience levels. Training a driver of certain automated driving capabilities and limits is difficult without actual driving in ADS mode.

Edge or corner scenarios are atypical or anomalous driving environment events where a vehicle in an ADS mode may be incapable or fail at performing appropriate driving maneuvers or trajectories. It is difficult with current solutions to effectively and conveniently train a driver for edge scenarios, corner scenarios, maneuver limitations, faulty system events, atypical driving events, unusual driving states, or the like where automated driving may fail. Training is also needed for a driver to determine when intervention or takeover is appropriate or needed during anomalous driving events for safer automated mode operation. Thus, it is desirable to effectively and quickly train a driver of automated driving capabilities or limitations of a vehicle.

SUMMARY

In one embodiment, example systems and methods relate to a manner of improving driver training of an automated driving system (ADS) by simulation, while driving, of an anomalous or atypical driving event. As previously noted, comprehensively training a driver of ADS limitations may be time-consuming, inconvenient, or ineffective. Therefore, an improved approach to driver training is disclosed where a training system determines safe conditions for simulating an anomalous driving event and then performs the anomalous driving event, while driving on the road, to teach the driver of ADS limitations and capabilities. The training system may determine and assess, before simulation, if a vehicle behavior affects the safety of one or more entities. The training system may also compare the state of certain entities to a threshold. If the state satisfies the threshold, the ADS or vehicle applies the brakes, accelerates, deaccelerates, steers, disengages the ADS, or the like while driving to simulate and perform the vehicle behavior. In this way, the training system improves driver training by safely simulating ADS limitations, while driving for the driver to experience anomalous vehicle behavior, such that the driver quickly and effectively learns automated capabilities of the vehicle.

A training system for improving the training of a driver of a vehicle about occurrences of anomalous driving events is disclosed. In one embodiment, the training system includes one or more processors and a memory communicably coupled to the one or more processors. The memory stores a determination module including instructions that when executed by the one or more processors cause the one or more processors to determine, upon receiving a selection of a vehicle behavior from one or more anomalous driving events and a detected state change signal, whether the vehicle behavior affects one or more entities. The determination module also includes instructions that when executed by the one or more processors cause the one or more processors to assess a state of the one or more entities to simulate the vehicle behavior according to a safety standard. The simulation of the vehicle behavior is triggered if the state satisfies a threshold. The memory also stores an actuator module including instructions that when executed by the one or more processors cause the one or more processors to simulate the vehicle behavior by at least controlling the vehicle to perform the vehicle behavior during automated driving of the vehicle.

In one embodiment, a non-transitory computer-readable medium for improving the training of a driver of a vehicle about occurrences of anomalous driving events and including instructions that when executed by one or more processors cause the one or more processors to perform one or more functions is disclosed. The instructions include instructions to determine, upon receiving a selection of a vehicle behavior from one or more anomalous driving events of a vehicle and a detected state change signal, whether the vehicle behavior affects one or more entities. The instructions also include instructions to assess a state of the one or more entities to simulate the vehicle behavior according to a safety standard. The instructions also include instructions to trigger simulation of the vehicle behavior if the state satisfies a threshold. The instructions also include instructions to simulate the vehicle behavior by at least controlling the vehicle to simulate the vehicle behavior during automated driving of the vehicle.

In one embodiment, a method for improving the training of a driver of a vehicle about occurrences of anomalous driving events is disclosed. In one embodiment, the method includes determining, upon receiving a selection of a vehicle behavior from one or more anomalous driving events and a detected state change signal, whether the vehicle behavior affects one or more entities. The method also includes assessing a state of one or more entities to simulate the vehicle behavior according to a safety standard. The simulation of the vehicle behavior is triggered if the state satisfies a threshold. The method also includes simulating the vehicle behavior by at least controlling the vehicle to simulate the vehicle behavior during automated driving of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the training of a driver about occurrences of anomalous, atypical, or abnormal driving events by intentionally simulating anomalous driving events while driving in automated driving system (ADS) mode are disclosed herein. To effectively and quickly train a driver of various experience levels, a training system determines safe conditions for simulating an anomalous driving event and then performs the anomalous driving event, while driving on the road, to train the driver of ADS limitations and capabilities. The training system determines and assesses if a selected vehicle behavior affects the safety of one or more entities. For example, one more or entities can be the ADS or a person. The condition or the state of one or more entities is compared by the training system to a threshold. If the condition or the state satisfies the threshold, the ADS or vehicle in one or more arrangements, applies the brakes, accelerates, deaccelerates, steers, disengages the ADS, or the like while driving on the road to simulate the vehicle behavior. As such, the training system causes the ADS to fail safely and intentionally so that a driver is trained by the training system to learn about scenarios where the ADS may not perform correctly and fail. In this way, the training system improves driver training by demonstrating ADS limitations through anomalous vehicle behavior while driving such that the driver quickly and effectively learns the automated capabilities of the vehicle.

Figure 1:
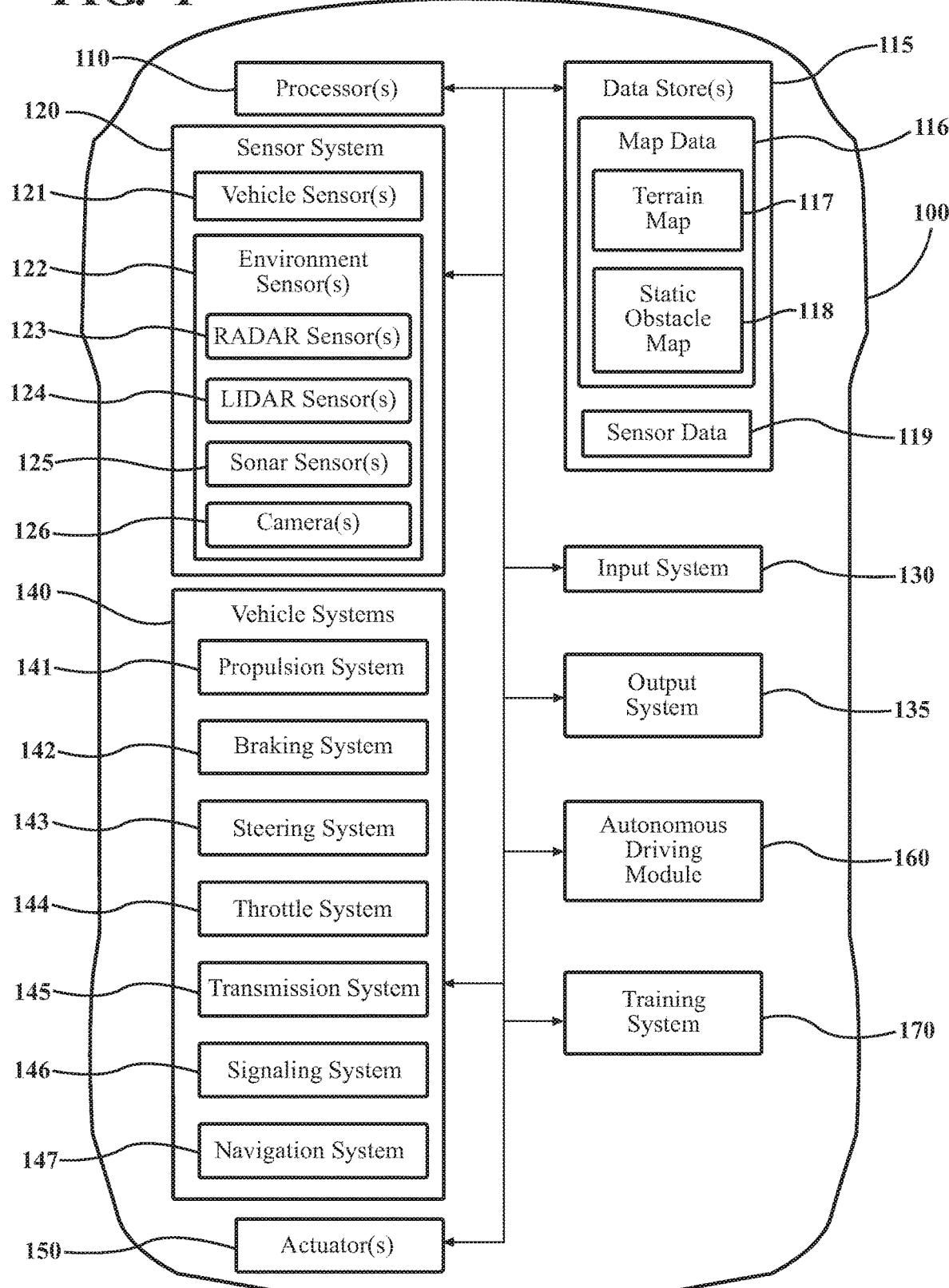
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with a training system intentionally simulating anomalous driving events while driving.

The vehicle 100 also includes various elements. It will be understood that in various embodiments, the vehicle 100 having all of the elements shown in FIG. 1 may be unnecessary. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or another system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a training system 170 that is implemented to perform methods and other functions as disclosed herein relating to improving the training of a driver about occurrences of anomalous driving events.

Figure 2:
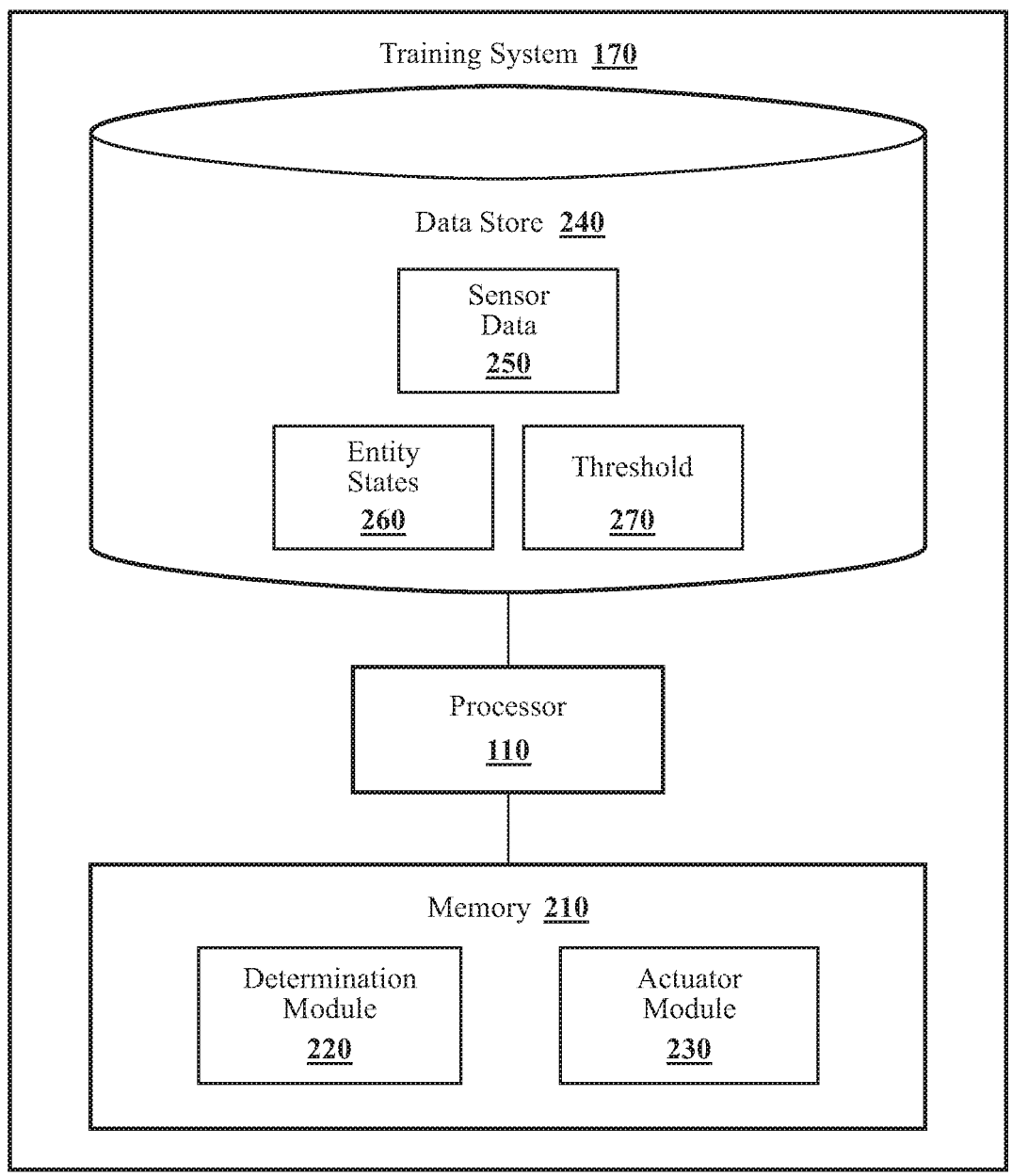
FIG. 2 illustrates one embodiment of a training system for training a driver about occurrences of anomalous driving events that are associated with the vehicle of FIG. 1.

FIG. 2 illustrates one embodiment of a training system 170 for training a driver about occurrences of anomalous driving events that are associated with the vehicle of FIG. 1. The training system 170 is shown as including a processor 110 from the vehicle 100 of FIG. 1. Accordingly, the processor 110 may be a part of the training system 170, the training system 170 may include a separate processor from the processor 110 of the vehicle 100, or the training system 170 may access the processor 110 through a data bus or another communication path. In one embodiment, the training system 170 includes a memory 210 that stores a determination module 220 and an actuator module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The training system 170 as illustrated in FIG. 2 is generally an abstracted form. With reference to FIG. 2, the determination module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the determination module 220, in one embodiment, acquires sensor data 250 that includes at least camera images. In further arrangements, the determination module 220 acquires the sensor data 250 from further sensors such as a radar, a light detection and ranging (LiDAR) sensor, and other sensors as may be suitable for identifying vehicles and locations of the vehicles.

Accordingly, the determination module 220, in one embodiment, controls the respective sensors (e.g., inertial measurement unit (IMU), input sensors, etc.) to provide the data inputs in the form of the sensor data 250. Additionally, while the determination module 220 is discussed as controlling the various sensors to provide the sensor data 250, in one or more embodiments, the determination module 220 can employ other techniques to acquire the sensor data 250 that are either active or passive. For example, the determination module 220 can passively sniff the sensor data 250 from a stream of electronic information provided by the various sensors to further components within the vehicle 100. Moreover, the determination module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine revolutions per minute (RPM), driving mode for hybrid vehicles, etc.), and so on. In yet further aspects, the sensor data 250 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

Of course, depending on the sensors that the vehicle 100 includes, the available information that the training system 170 can harvest as the sensor data 250 may vary. As one example, according to a particular implementation, the vehicle 100 may include different versions of an IMU sensor that are separately capable of different measurements. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the modules 220 or 230 may, in one or more approaches, be configured to adapt to different electronic inputs depending on the availability of such information. As an additional note, telematics data as used herein generally encompasses the sensor data 250 and may include further information such as vehicle identifiers, location information (e.g., GPS position), etc.

In addition to locations of surrounding vehicles, the sensor data 250 may also include, for example, information about lane markings, and so on. Moreover, the determination module 220, in one embodiment, controls the sensors to acquire the sensor data 250 about an area that encompasses 360 degrees about the vehicle 100 in order to provide a comprehensive assessment of the surrounding environment. Of course, in alternative embodiments, the determination module 220 may acquire the sensor data 250 about a forward direction alone when, for example, the vehicle 100 is not equipped with further sensors to include additional regions about the vehicle and/or the additional regions are not scanned due to other reasons.

Moreover, in one embodiment, the training system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 240 also includes the entity states 260 and the threshold 270. For example, an entity may be the vehicle, the ADS, a driver, a passenger, or a person in the vehicle 100. An ADS may comprise an autonomous driving module(s) 160, parts of sensor system 120, parts of the vehicle systems 140, the actuators 150, and the data store(s) 115 that operate together to autonomously drive and control the vehicle 100. In another example, the entity may be a pedestrian, another vehicle, or an object proximate to the vehicle 100. Accordingly, entity states 260 may be states associated with driver proficiency, driver level, driver attention, passenger safety, pedestrian safety, or the like. Examples of other states may include the ADS moving the vehicle to a different road, a cruising speed increase/decrease, an increase/decrease in the number of vehicles on the road, a change of the type of road (e.g. urban, suburban, highway, local, etc.), a change in weather, a time of day, reliability of an ADS travel plan, or the like.

Furthermore, the threshold 270 can be, for example, a parameter or value that may be equal to, greater than, or less than a measurement of factors related to the affect to or the state of one or more entities. As further explained herein, these and more factors related to the threshold 270 may be satisfied exactly or in varying degrees for the simulation of the anomalous or atypical driving event. For example, the reliability of an ADS travel plan may be associated with factors to be satisfied related to measurements of the surrounding physical environment of the vehicle, a vehicle position on a road, an N number of obstacles on the road, a position of a number of obstacles, a vehicle driving state, a driver behavior, an experience level of the driver in an automated driving mode, map data of the surrounding environment, a distance to physical boundaries, or the like.

The determination module 220, in one embodiment, is further configured to perform additional tasks beyond controlling the respective sensors to acquire and provide the sensor data 250. For example, the determination module 220 determines, upon receiving a selection of a vehicle behavior from one or more anomalous driving events and a detected state change signal, whether a simulation of the vehicle behavior will affect one or more entities. An assessment is also made of a state of certain entities to simulate the vehicle behavior according to a safety standard. The simulation of the vehicle behavior is triggered if the state satisfies the threshold 270. In this way, the training system determines if the simulation of the vehicle behavior can be performed safely and effectively by considering the affect to entities, assessing simulation safety, considering entity states 260, or satisfying the threshold 270.

Once triggered, the simulation is performed in part by actuator module 230. The actuator module 230 simulates the vehicle behavior by at least controlling the vehicle to cause driving actions. For example, the actuator module 230 applies the brakes, accelerates, deaccelerates, steers, disengages the ADS, or the like while driving on the road to simulate the vehicle behavior. As part of the driver training, the driving actions effectively demonstrate and teach the driver of ADS limitations and capabilities of the vehicle 100.

In one approach, a machine learning algorithm embedded within the determination module 220, such as a convolutional neural network (CNN), performs semantic segmentation over the sensor data 250 from which further information is derived. Of course, in further examples, the determination module 220 employs different machine learning algorithms or implements different approaches for performing the associated functions. Whichever particular approach the determination module 220 implements, the determination module 220 provides an output with semantic labels identifying objects represented in the sensor data 250. Accordingly, triggering simulation of a vehicle behavior may use machine learning outputs of semantic labels to determine parameters for the affect to or state of entities related to the simulation of vehicle behaviors.

In the forthcoming examples, the determination module 220 of the training system 170 utilizes the sensor data 250, the entity states 260, and the threshold 270 to safely simulate anomalous driving events. In particular, the determination module 220 uses, for example, the sensor data 250 to measure the affect, impact, or influence of the vehicle behavior to the entities. The determination module can also use, for example, the sensor data 250 and the sensor system 120 to determine the state of the entities. Actuator module 230 of the training system 170 simulates the vehicle behavior if the state of one or more entities satisfies the threshold 270.

Figure 3:
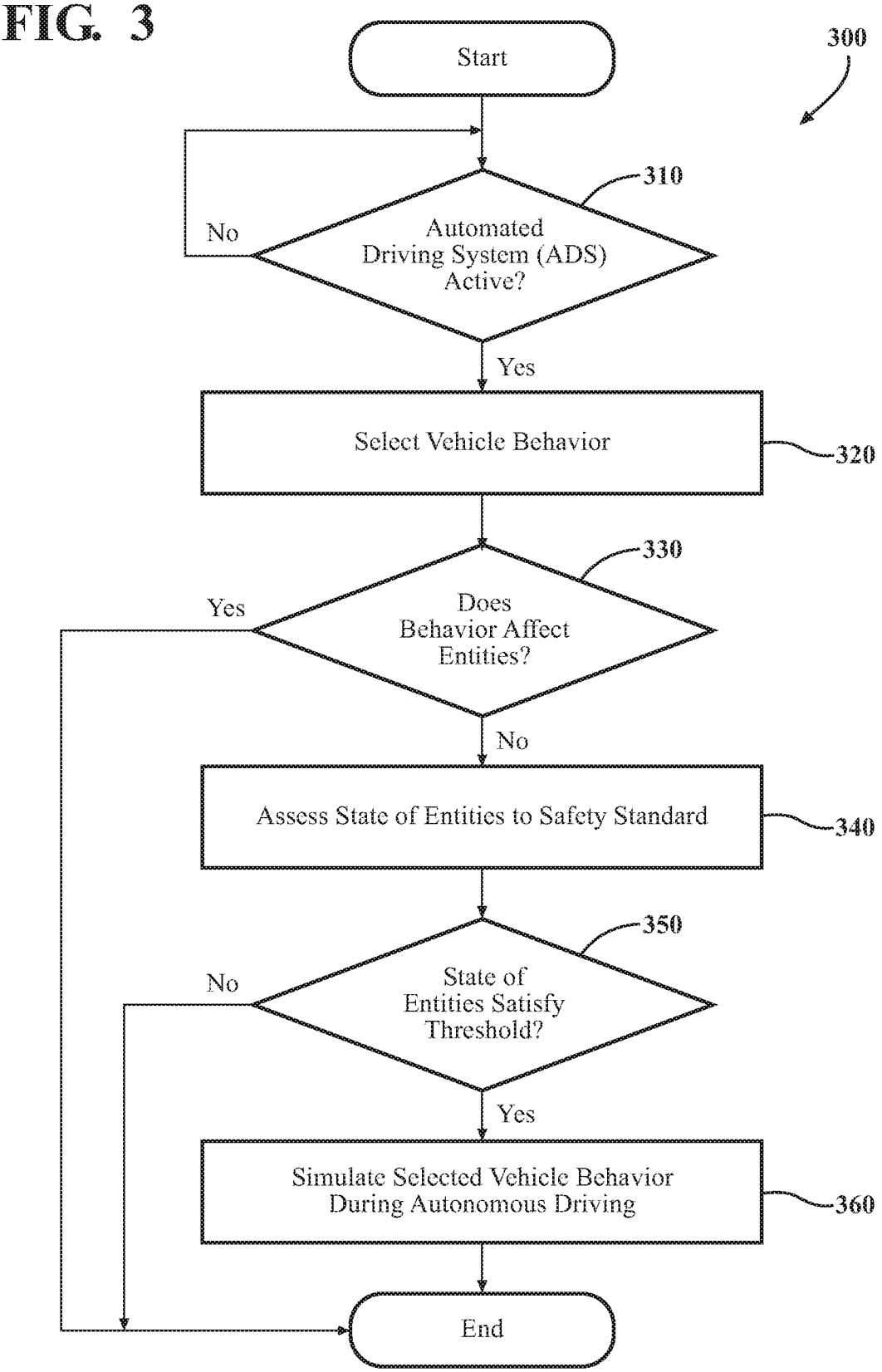
FIG. 3 illustrates one embodiment of a method that is associated with a training system for training of a driver about occurrences of anomalous driving events.

FIG. 3 illustrates one embodiment of a method 300 that is associated with a training system for training of a driver about occurrences of anomalous driving events. Method 300 will be discussed from the perspective of the training system 170 of FIGS. 1 and 2. While method 300 is discussed in combination with the training system 170, it should be appreciated that the method 300 is not limited to being implemented within the training system 170 but is instead one example of a system that may implement the method 300.

As a brief introduction to the method 300, prior to the discussion of the explicitly identified functions, a vehicle behavior of an anomalous driving event is simulated by training system 170 to teach a driver while driving in ADS mode. ADS mode may refer to, for example, navigating and/or maneuvering the vehicle along a travel route using a computing system(s) to control the vehicle with minimal or no input from a human driver. In the examples given herein, the vehicle behavior may be a failure of identifying an object or vegetation as a person on the road. A vehicle may also fail to detect another vehicle or traffic light state such that the vehicle believes the travel route is clear. Moreover, the vehicle behavior is simulated if certain entities are not affected and based on an assessment of the state of the entities to meet a safety standard. Training system 170 performs the simulation if the state of the entities satisfies the threshold 270, as explained herein.

At 310 of method 300, if the ADS is active, a vehicle behavior from one or more anomalous driving events is selected at 320 for vehicle 100. For example, a vehicle behavior is selected based on a recent software update, a driver level, a driver's proficiency, a driver's age, a driver's habits, a driving history, the current driving environment, or the like requiring training of a driver of vehicle 100 limitations. In an embodiment, the selection action by training system 170 may determine training certain advanced drivers.

At 330, the training system 170 subsequently determines whether the simulation of the selected vehicle behavior will affect one or more entities. For example, one or more entities can be the vehicle 100, the ADS, a driver, a passenger, or a person in the vehicle 100 that may be harmed, alarmed, or negatively impacted by the simulation. One or more entities can also be a pedestrian, another vehicle, or an object proximate to the vehicle 100. Also, as another example, the affect to harm or alarm one or more entities can be associated with sudden braking, sudden steering, sudden acceleration, sudden deceleration, or the like.

At 340, the training system 170 makes an assessment of the state or condition of one or more entities to a safety standard if the selected vehicle behavior does not affect one or more entities. Determining the affect to one or more entities is necessary to ensure the vehicle behavior can be simulated safely and effectively by the training system 170. A state or a condition may be associated with driver proficiency, driver level, driver attention, passenger safety, pedestrian safety, or the like. Examples of other states may include the ADS moving the vehicle to a different road, a cruising speed increase/decrease, an increase/decrease in the number of vehicles on the road, a change of the type of road (e.g. urban, suburban, highway, local, etc.), a change in weather, a time of day, reliability of an ADS travel plan, or the like.

Furthermore, a safety standard can be one set by a government agency, a standards development organization (SDO), or the like. For example, a safety standard may be one of the Federal Motor Vehicle Safety Standards (FMVSS) enforced by the National Highway Traffic Safety Administration (NHTSA) in the United States. The FMVSS includes three categories for safety assessment: crash avoidance (100-series), crashworthiness (200-series), and post-crash survivability (300-series). The training system 170 and the determination module 220 may assess the state or condition of the one or more entities in association with parameters or variables derived from the FMVSS or any other safety standard.

At 350 of method 300, the training system 170 subsequently determines if the state or condition of one or more entities satisfies the threshold 270. As an example, the threshold 270 can be a parameter or value that may be equal to, greater than, or less than a measurement of the affect to or the state of one or more entities to be satisfied for the simulation of the anomalous driving event. Satisfying the threshold can be defined as a condition of correct working for the vehicle, ADS, or other entities to safely and intentionally perform the simulation of the anomalous driving event while driving.

At 360, the training system 170 and actuator module 230 simulate the selected vehicle behavior during autonomous driving on the road in a vehicle driving environment. For example, the actuator module 230 applies the brakes, accelerates, deaccelerates, steers, disengages the ADS, or the like while driving on the road to simulate the vehicle behavior. As part of the driver training, the driving actions effectively demonstrate and teach the driver of ADS limitations of the vehicle 100. For instance, the training system 170 may demonstrate to a driver that the vehicle 100 may brake when mistakenly detecting vegetation as a person in a travel route or driving environment. In method 300, if any of the conditions of 310, 330, or 350 are unmet, the method ends.

Figure 4:
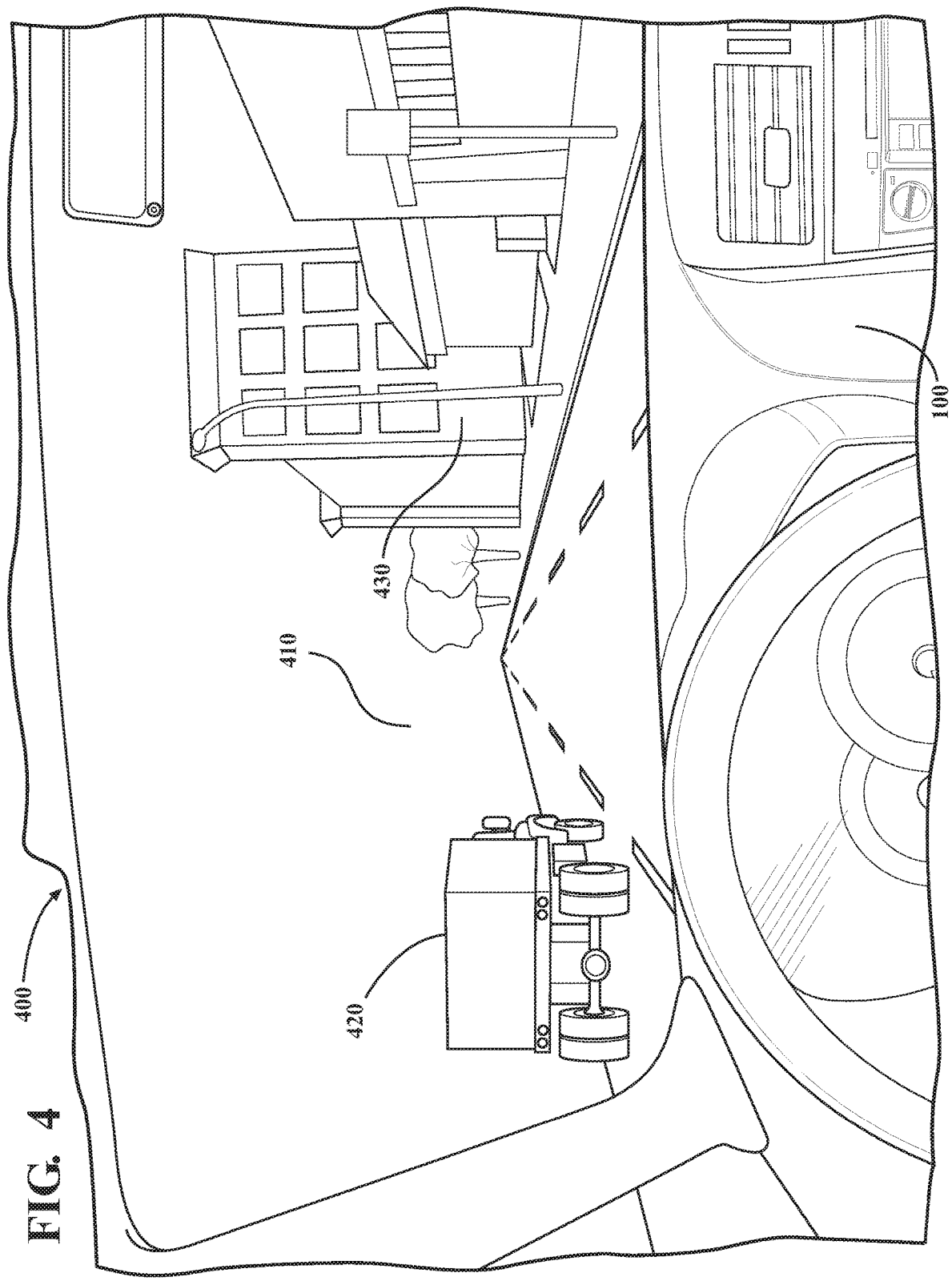
FIG. 4 illustrates one embodiment for training a driver about an occurrence of an anomalous driving event associated with an object detection failure.

FIG. 4 illustrates one embodiment for training a driver about an occurrence of an anomalous driving event associated with an object detection failure. In a simulation, the training environment 400 intentionally stops vehicle 100 when failing to detect an object, that may not actually be in the travel route, and generating erroneous driver notifications to demonstrate vehicle sensor limitations. In the training environment 400, the vehicle 100 is traveling in ADS mode on the multi-lane road in the vehicle driving environment 410. As further explained herein, ADS mode refers to navigating or maneuvering the vehicle 100 along a travel route using one or more computing systems to control the vehicle 100 with minimal or no input from a human driver. In the vehicle driving environment 410, the vehicle 100 may also be configured with one or more semi-autonomous operational modes in which one or more computing systems perform a portion of the navigation or maneuvering of the vehicle along a travel route, and a vehicle operator (i.e., driver) provides inputs to the vehicle to perform a portion of the navigation or maneuvering of the vehicle 100 along the travel route.

The vehicle driving environment 410 may be a multi-lane road used by the travel route of the vehicle 100 in ADS mode. As part of the vehicle driving environment 410, the truck 420 may be traveling in the left lane of the multi-lane road. The vehicle 100 travels autonomously in ADS mode in the right lane. Although a truck is shown, any vehicle, automobile, van, conveyance, motorcycle, scooter, or the like may travel on the multi-lane road while the vehicle 100 travels autonomously in the right lane. An area including buildings, street lights, signs, trees, or the like may be proximate to the multi-lane road as part of the vehicle driving environment 410, that the vehicle 100 may monitor for automated driving at least with the sensor system 120 or the data store(s) 115.

The training system 170, to train the driver of the vehicle 100 about occurrences of anomalous driving events, may initiate or utilize the determination module 220. The determination module 220 determines, upon receiving a selection of a vehicle behavior for an anomalous driving event of a vehicle as to the sensor system 120 limitations and a detected state change signal, whether simulation affects one or more entities. The training system 170 may detect a state change signal using information from the sensor data 250 acquired through the sensor system 120. For example, a detected state change can be the ADS moving the vehicle to a different road, a cruising speed increase/decrease, increase/decrease in the number of vehicles on the road, a change of the type of road (e.g. urban, suburban, highway, local, etc.), a change in weather, a time of day, reliability of an ADS travel plan, or the like. In the vehicle driving environment 410, the simulated vehicle behavior of the sensor system 120 limitations may be the sensor system 120 of the vehicle 100 being unable to detect the object 430 or color of the vehicle driving environment 410. As an example, the object 430 can be a light post. However, the training system 170 may simulate any object that the ADS potentially fails to detect.

In certain embodiments, training system 170 may associate potential failures with a limitation of sensor system 120 associated with a limitation of the ADS, a system error, an ADS malfunction, or the like being unable to recognize certain objects in the vehicle driving environment 410. Color detection failures may relate to detecting colors of other vehicles, vegetation, road signs, traffic lights, items on pedestrians, or the like.

As explained herein, determination module 220 assesses a state or a condition of one or more entities to simulate limitations of the sensor system 120 according to a safety standard. In one approach, the training system 170 triggers the simulation if the state or condition satisfies the threshold 270. In the vehicle driving environment 410, the simulation of the anomalous event, through one or more actuators 150, includes braking, decelerating, or stopping the vehicle 100 because the sensor system 120 was unable to recognize certain objects in the vehicle driving environment 410. As part of the simulation, the navigation system 147 or the output system 135 notifies or prompts the driver using audio devices, visual devices, haptic devices, or the like. For example, the navigation system 147 can utilize the output system 135 to display a notification. The notification or a prompt communicates to the driver simulation of the anomalous vehicle behavior as part of the training. The notification may be an erroneous message that a sensor failed to cause the vehicle to stop. For instance, the message may be "unable to detect environment using sensors. The system is stopping the vehicle."

The training system 170 simulation of the sensor system 120 limitations terminates when the simulation completes, a timer expires, the driver takes over, the vehicle driving environment 410 is no longer safe for performing the simulation, or the like. As an example, the simulation may terminate when another vehicle on the multi-lane road approaches the vehicle 100 in a manner where the threshold 270 is no longer satisfied. As another example, driver attention or participation may be sensed during ADS mode by the sensor system 120 and the camera 126 such that the threshold 270 is no longer satisfied.

The simulation of the sensor system 120 limitations while driving may effectively and quickly teach the driver that detection, recognition, or tracking of objects by the ADS is imperfect from time-to-time. Simulating induced or injected false positive or negative vehicle behavior, intentionally by the ADS while driving in ADS mode, assists the driver to witness the limits or nuisances of the ADS. The driver may also learn causes or reasons for the vehicle 100 abruptly or accidentally stopping for certain objects. The driver may also learn that when the vehicle 100 abruptly or accidentally stops, regardless of a cause or reason, the driver may have to take over driving.

Figure 5:
FIG. 5 illustrates another embodiment for training a driver about an anomalous driving event associated with a vegetation detection failure.

FIG. 5 illustrates one embodiment for training a driver about an anomalous driving event associated with vegetation detection failure. In a simulation, the training environment 500 intentionally stops vehicle 100 when erroneously and mistakenly detecting vegetation as a person. The training system 170 stops the vehicle 100 to demonstrate detection failure to a driver for training. In the training environment 500, the vehicle 100 is traveling in ADS mode on the multi-lane road, thru-way, expressway, interstate road, or the like in the vehicle driving environment 510. As part of the vehicle driving environment 510, a vehicle 520 may be traveling in the left lane of the multi-lane road while vehicle 100 travels autonomously in ADS mode in the right lane. The vehicle 100 may monitor the vehicle driving environment 510 for automated driving, at least with the sensor system 120 or the data store(s) 115.

In the vehicle driving environment 510 the training system 170, to train the driver of vehicle 100 about anomalous driving events, may initiate or utilize the determination module 220. The determination module 220 determines, upon receiving a selection of a vehicle behavior for an anomalous driving event of a vehicle as vegetation detection failure and a detected state change signal, whether the simulation of the vehicle behavior will affect one or more entities. As explained herein, the training system 170 may detect a state change signal using information from the sensor data 250 acquired through the sensor system 120. In the vehicle driving environment 510, the simulated vehicle behavior may falsely identify the vegetation 530 as a person standing near the path of travel of the vehicle 100. For example, the potential failure can be associated with a limitation of the ADS, a system error, an ADS malfunction, the sensor system 120 malfunctions, or the like failing to properly detect, identify, or recognize the vegetation 530 in the vehicle driving environment 510.

As explained herein, the determination module 220 then assesses a state or a condition of one or more entities to simulate the vegetation detection failure according to a safety standard. The simulation of the vehicle behavior is triggered if the state satisfies the threshold 270. In the vehicle driving environment 510, the simulation of the anomalous event is the ADS, through one or more actuators 150, forcefully braking, sharply steering, or abruptly steering the vehicle 100 because of identifying or recognizing the vegetation 530 in the vehicle driving environment 510 as a person standing near the path of travel of the vehicle 100. As part of the simulation, the navigation system 147 or the output system 135 notifies or prompts the driver using audio devices, visual devices, haptic devices, or the like. For example, the navigation system 147 can utilize the output system 135 to display a notification. The notification may be an erroneous message that the vehicle maneuvered to avoid a person. The notification or prompt communicates to the driver the simulation details of the anomalous vehicle behavior as part of the driving training. For example, the message may be "a person is standing in front of the vehicle. The system is applying the brakes to avoid a collision." As another example, for sharply or abruptly steering, the notification may be: "a person is standing in front of the vehicle. The system is steering to the left to avoid a collision."

The training system 170 simulation of vegetation detection failure terminates when the simulation completes, a timer expires, the driver takes over, the vehicle driving environment 510 is no longer safe for performing the simulation, or the like. As an example, the simulation may terminate when another vehicle on the multi-lane road approaches the vehicle 100 in a manner where the threshold 270 is no longer satisfied. As another example, driver attention or participation during ADS mode is sensed by the sensor system 120 and camera 126 such that the threshold 270 is no longer satisfied.

Similar to simulation in the vehicle driving environment 410, the simulation of the vegetation detection failure while driving effectively and quickly teaches the driver that detection, recognition, or tracking of vegetation by the ADS is imperfect from time-to-time. Simulating induced or injected false positive or negative vehicle behavior, intentionally by the ADS while driving in ADS mode, assists the driver to witness the limits or nuisances of the ADS. The driver may also learn causes or reasons for the vehicle 100 abruptly or accidentally stopping around vegetation. The driver may also learn that when the vehicle 100 abruptly or accidentally stops, regardless of a cause or reason, the driver may have to take over driving.

Figure 6:
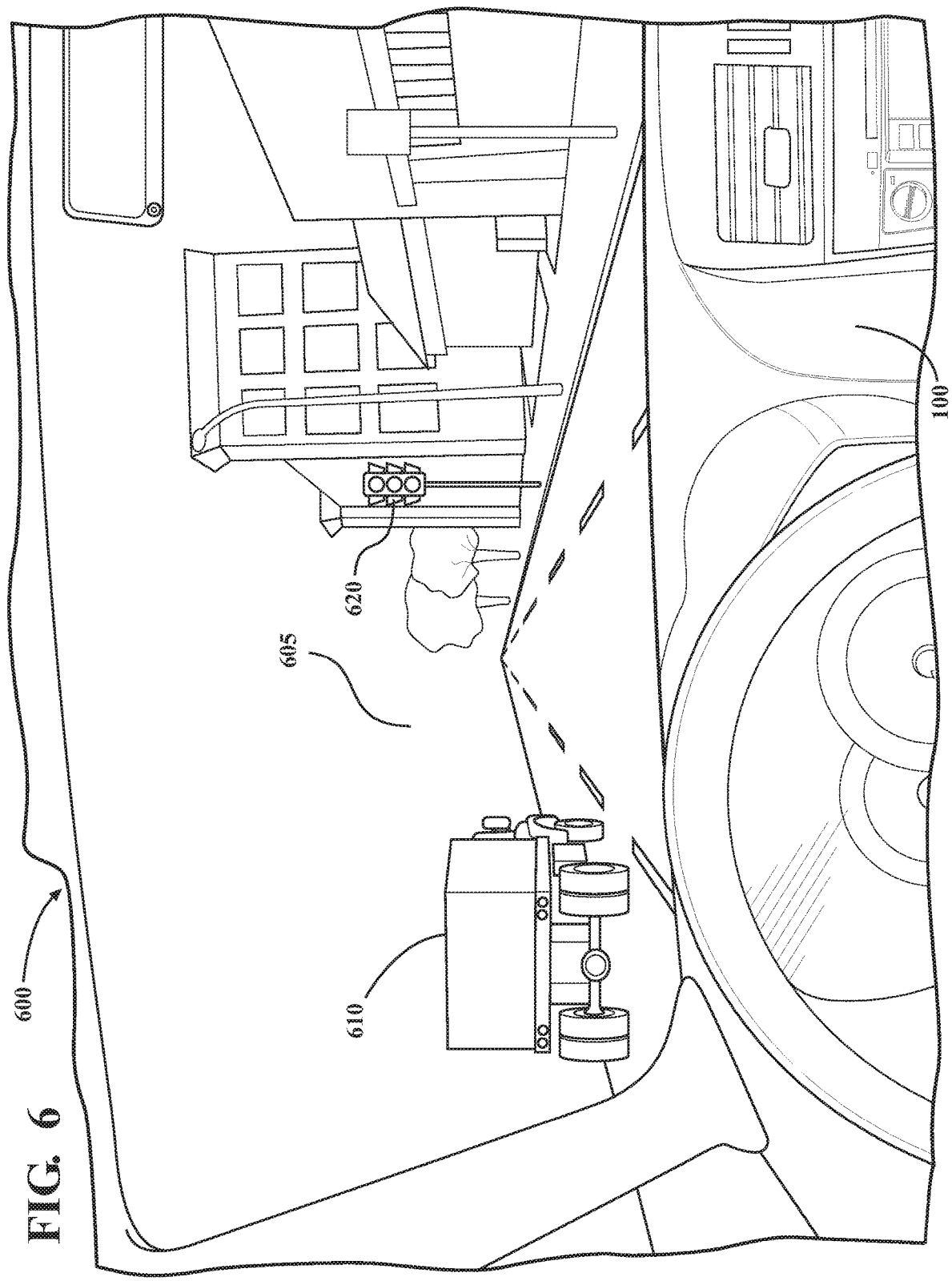
FIG. 6 illustrates another embodiment for training a driver about an anomalous driving event associated with another vehicle or traffic light state detection failure.

FIG. 6 illustrates one embodiment for training a driver about an anomalous driving event associated with another vehicle or traffic light state detection failure. In a simulation, the training environment 600 does not decrease speed or deaccelerate the vehicle 100 because of failing to detect another vehicle or a red traffic light state in a travel route. In the training environment 600, the vehicle 100 is traveling in ADS mode on the multi-lane road in the vehicle driving environment 605. As further explained herein, ADS mode refers to navigating or maneuvering the vehicle 100 along a travel route using one or more computing systems to control the vehicle 100 with minimal or no input from a human driver.

The vehicle driving environment 605 may be a multi-lane road for the travel route by the vehicle 100 in ADS mode. As part of the vehicle driving environment 605, the truck 610 may be traveling in the left lane of the multi-lane road. The vehicle 100 travels autonomously in the right lane. Although a truck is shown, any vehicle, automobile, van, conveyance, motorcycle, scooter, or the like may travel on the multi-lane road while the vehicle 100 travels autonomously in the right lane. An area including buildings, street lights, signs, trees, or the like may be proximate to the multi-lane road as part of the vehicle driving environment 605, that the vehicle 100 may monitor for automated driving at least with the sensor system 120 or the data store(s) 115.

In the vehicle driving environment 605, the training system 170, to train the driver of the vehicle 100 about anomalous driving events, may initiate or utilize the determination module 220. The determination module 220 determines, upon receiving a selection of a vehicle behavior for an anomalous driving event of a vehicle as another vehicle or traffic light state detection failure and a detected state change signal, whether the simulation of the vehicle behavior will affect one or more entities. As explained herein, the training system 170 may detect a state change signal using information from the sensor data 250 acquired through the sensor system 120.

In the vehicle driving environment 605, the simulated vehicle behavior of another vehicle or a traffic light state detection failure may be the vehicle 100 failing to detect the truck 610 or the red traffic light 620 and the ADS, through one or more actuators 150, does not decrease speed or deaccelerate. Failing to detect another vehicle may also include failing to detect the velocity of another vehicle. In certain embodiments, this simulation may apply when the vehicle 100 is traveling at a relatively slow speed or velocity. For example, the vehicle 100 potentially failing may be associated with a limitation of the ADS, a system error, an ADS malfunction, the sensor system 120 malfunction, or the like to properly detect, identify, or recognize these scenarios in the vehicle driving environment 510.

As explained herein, the determination module 220 then assesses, in one or more arrangements, a state or a condition of one or more entities to simulate another vehicle or traffic light state detection failure according to a safety standard. When the state or condition satisfies the threshold 270, the determination module 220 triggers the simulation. In the vehicle driving environment 605, the simulation of the anomalous event is the ADS failing to decrease the speed of the vehicle 100 because the sensor system 120 was unable to recognize another vehicle or a traffic light state in the vehicle driving environment 605. As part of the simulation, the navigation system 147 or the output system 135 notifies or prompts the driver using audio devices, visual devices, haptic devices, or the like. The notification or prompt communicates to the driver the simulation details of the anomalous vehicle behavior as part of the driver training. For example, the navigation system 147 can utilize the output system 135 to display a notification, such as through an erroneous message that the vehicle path is clear. For example, the notification may be: "path is clear. The system is driving through the intersection." As another example, another notification may be: "no brakes." In certain embodiments, for the safety of this particular simulation, if the driver does not take over, the ADS may delay the braking. However, ADS may not delay braking beyond a certain point so that a potential collision with truck 610, another vehicle, an obstacle, or the like is avoided.

The training system 170 simulation of another vehicle or a traffic light state detection failure terminates when the simulation completes, a timer expires, the driver takes over, the vehicle driving environment 605 is no longer safe for performing the simulation, or the like. As an example, the simulation may terminate when another vehicle on the multi-lane road approaches the vehicle 100 in a manner where the threshold 270 is no longer satisfied. As another example, the sensor system 120 and a camera 126 may sense driver attention or participation during ADS mode according to satisfaction of the threshold 270.

For training, the training system 170 simulation of another vehicle or traffic light state detection failure while driving may effectively and quickly teach the driver that detection, recognition, or tracking of objects by the ADS is imperfect from time-to-time. Simulating induced or injected false positive or negative vehicle behavior, intentionally by the ADS while driving in ADS mode, assists the driver to witness the limits or nuisances of the ADS. The driver may also learn causes or reasons for the vehicle 100 abruptly or accidentally stopping. The driver may also learn that when the vehicle 100 abruptly or accidentally stops, regardless of a cause or reason, the driver may have to takeover driving.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As an autonomous vehicle, vehicle 100 may be configured to use an ADS to perform autonomous functions through the autonomous driving module(s) 160. As used herein, "autonomous vehicle" or automated vehicle refers to a vehicle that is capable of operating in an autonomous, automated, or ADS mode (e.g., category 5, full automation). "Autonomous mode" or ADS mode refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application specific integrated circuit (ASIC), a microprocessor, etc. The vehicle 100 can include one or more data store(s) 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain map(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect a position and orientation changes of the vehicle 100, such as, for example, based on inertial acceleration. In one or more arrangements, the vehicle sensor(s) 121 can include one or more accelerometers, one or more gyroscopes, an IMU, a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the training system 170, and/or the autonomous driving module(s) 160 can be operatively connected to communicate with the various vehicle systems 140 and/or individual components thereof. For example, the processor(s) 110 and/or the autonomous driving module(s) 160 can be in communication to send and/or receive information from the various vehicle systems 140 to control the movement of the vehicle 100. The processor(s) 110, the training system 170, and/or the autonomous driving module(s) 160 may control some or all of the vehicle systems 140 and, thus, may be partially or fully autonomous as defined by the Society of Automotive Engineers (SAE) 0 to 5 levels.

As another example, the processor(s) 110, the training system 170, and/or the autonomous driving module(s) 160 can be operatively connected to communicate with the various vehicle systems 140 and/or individual components thereof. For example, the processor(s) 110, the training system 170, and/or the autonomous driving module(s) 160 can be in communication to send and/or receive information from the various vehicle systems 140 to control the movement of the vehicle 100. The processor(s) 110, the training system 170, and/or the autonomous driving module(s) 160 may control some or all of the vehicle systems 140.

The processor(s) 110, the training system 170, and/or the autonomous driving module(s) 160 may be operable to control the navigation and maneuvering of the vehicle 100 by controlling one or more of the vehicle systems 140 and/or components thereof. For instance, when operating in an automated or autonomous mode, the processor(s) 110, the training system 170, and/or the autonomous driving module(s) 160 can control the direction and/or speed of the vehicle 100. The processor(s) 110, the training system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components responsive to receiving signals or other inputs from the processor(s) 110 and/or the autonomous driving module(s) 160. For instance, the one or more actuators 150 can include motors, pneumatic actuators, hydraulic pistons, relays, solenoids, piezoelectric actuators, or the like.

The vehicle 100 can include one or more modules, at least some of which are described herein. The modules can be implemented as computer-readable program code that, when executed by the processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the training system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by an occupancy module. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, reversing, or the like. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A training system for improving training of a driver of a vehicle about occurrences of anomalous driving events, comprising:
   one or more processors;
   a memory communicably coupled to the one or more processors and storing:
   a determination module including first instructions that when executed by the one or more processors cause the one or more processors to:
      determine, upon receiving a vehicle behavior from one or more anomalous driving events and a detected state change signal, whether the vehicle behavior affects one or more entities;
      assess a state of the one or more entities to simulate the vehicle behavior according to a safety standard; and
      trigger simulation of the vehicle behavior if the state satisfies a threshold; and
   an actuator module including second instructions that when executed by the one or more processors cause the one or more processors to simulate the vehicle behavior by at least controlling an actuator to steer the vehicle to perform the vehicle behavior during automated driving of the vehicle.

2. The training system of claim 1, wherein the simulation of the vehicle behavior further includes braking the vehicle when the vehicle behavior is a sensor module that is unable to detect objects or colors in a driving environment near the vehicle, and
   wherein a navigation system module includes third instructions that when executed by the one or more processors cause the one or more processors to prompt the driver that the vehicle is unable to detect the objects or the colors in the driving environment.

3. The training system of claim 1, wherein the simulation of the vehicle behavior further includes braking the vehicle when the vehicle behavior is an automated driving module identifying vegetation near the vehicle as a person, and
   wherein a navigation system module includes third instructions that when executed by the one or more processors cause the one or more processors to prompt the driver that the person is proximate to the vehicle and that the braking was needed to avoid a collision.

4. The training system of claim 1, wherein the simulation of the vehicle behavior further includes to maintain speed or delay braking of the vehicle when the vehicle behavior is failing to detect another vehicle, failing to detect velocity of the another vehicle, or failing to detect a traffic light state, and
   wherein a navigation system module includes third instructions that when executed by the one or more processors cause the one or more processors to prompt the driver that a driving path is clear, driving will continue, or braking is unnecessary.

5. The training system of claim 1, wherein the simulation of the vehicle behavior terminates when one of the driver takes over driving or the state no longer satisfies the threshold.

6. The training system of claim 1, wherein the one or more entities is one of the driver and a passenger.

7. The training system of claim 1, wherein the one or more entities is a pedestrian, another vehicle, or an object proximate to the vehicle.

8. The training system of claim 1, wherein the one or more anomalous driving events are atypical driving environment scenarios.

9. A non-transitory computer-readable medium for improving training of a driver of a vehicle about occurrences of anomalous driving events and including instructions that when executed by one or more processors cause the one or more processors to:
   determine, upon receiving a vehicle behavior from one or more anomalous driving events of a vehicle and a detected state change signal, whether the vehicle behavior affects one or more entities;
   assess a state of the one or more entities to simulate the vehicle behavior according to a safety standard;
   trigger simulation of the vehicle behavior if the state satisfies a threshold; and
   simulate the vehicle behavior by at least controlling an actuator to steer the vehicle to perform the vehicle behavior during automated driving of the vehicle.

10. The non-transitory computer-readable medium of claim 9, wherein the instructions to simulate the vehicle behavior further include additional instructions to brake the vehicle when the vehicle behavior is a sensor module that is unable to detect objects or colors in a driving environment near the vehicle and to prompt the driver that the vehicle is unable to detect the objects or the colors in the driving environment.

11. The non-transitory computer-readable medium of claim 9, wherein the instructions to simulate the vehicle behavior further include additional instructions to brake the vehicle when the vehicle behavior is an automated driving module identifying vegetation near the vehicle as a person, and instructions to prompt the driver that the person is proximate to the vehicle and that the braking was needed to avoid a collision.

12. The non-transitory computer-readable medium of claim 9, wherein the instructions to simulate the vehicle behavior further include additional instructions to maintain speed or delaying braking of the vehicle when the vehicle behavior is failing to detect another vehicle, failing to detect velocity of the another vehicle, or failing to detect a traffic light state and to prompt the driver that a driving path is clear, driving will continue, or braking is unnecessary.

13. The non-transitory computer-readable medium of claim 9, wherein the instructions to simulate the vehicle behavior further include additional instructions to terminate the simulation by detection of one of the driver taking over driving or detecting when the state no longer satisfies the threshold.

14. A method for improving training of a driver of a vehicle about occurrences of anomalous driving events, the method comprising:
   determining, upon receiving a vehicle behavior from one or more anomalous driving events and a detected state change signal, whether the vehicle behavior affects one or more entities;
   assessing a state of the one or more entities to simulate the vehicle behavior according to a safety standard;
   triggering simulation of the vehicle behavior if the state satisfies a threshold; and
   simulating the vehicle behavior by at least controlling an actuator to steer the vehicle to perform the vehicle behavior during automated driving of the vehicle.

15. The method of claim 14, wherein simulating the vehicle behavior further includes braking the vehicle when the vehicle behavior is a sensor module that is unable to detect objects or colors in a driving environment near the vehicle, and
   prompting the driver that the vehicle is unable to detect the objects or the colors in the driving environment.

16. The method of claim 14, wherein simulating the vehicle behavior further includes braking the vehicle when the vehicle behavior is identifying vegetation near the vehicle as a person, and
   prompting the driver that the person is proximate to the vehicle and that the braking was needed to avoid a collision.

17. The method of claim 14, wherein simulating the vehicle behavior further includes maintaining speed or delaying braking of the vehicle when the vehicle behavior is failing to detect another vehicle, failing to detect velocity of the another vehicle, or failing to detect a traffic light state, and
   prompting the driver that a driving path is clear, driving will continue, or braking is unnecessary.

18. The method of claim 14, wherein simulating the vehicle behavior further includes terminating the simulation by detecting one of the driver taking over driving or detecting when the state no longer satisfies the threshold.

19. The method of claim 14, wherein the one or more entities is one of the driver and a passenger.

20. The method of claim 14, wherein the one or more entities is a pedestrian, another vehicle, or an object proximate to the vehicle.

* * * * *

UNITED STATES PATENT AND TRADEMARK OFFICE
CERTIFICATE OF CORRECTION

PATENT NO. : 11,605,306 B2
APPLICATION NO. : 16/916440
DATED : March 14, 2023
INVENTOR(S) : Hiromitsu Urano, Kentaro Ichikawa and Junya Ueno It is certified that error appears in the above-identified patent and that said Letters Patent is hereby corrected as shown below:

In the Claims

In Claim 9, Column 21, Line 19, please remove "of a vehicle".

Signed and Sealed this
Eleventh Day of April, 2023

Katherine Kelly Vidal
Director of the United States Patent and Trademark Office